(12) United States Patent
Masuki

(10) Patent No.: US 10,690,881 B2
(45) Date of Patent: Jun. 23, 2020

(54) ELECTRONIC APPARATUS

(71) Applicant: CANON KABUSHIKI KAISHA, Tokyo (JP)

(72) Inventor: Akihiko Masuki, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/935,778

(22) Filed: Mar. 26, 2018

(65) Prior Publication Data

US 2018/0217354 A1 Aug. 2, 2018

Related U.S. Application Data

(62) Division of application No. 15/381,758, filed on Dec. 16, 2016, now Pat. No. 9,958,636.

(30) Foreign Application Priority Data

Dec. 17, 2015 (JP) .................. 2015-246534

(51) Int. Cl.
*G02B 7/10* (2006.01)
*G03B 17/02* (2006.01)
(Continued)

(52) U.S. Cl.
CPC .............. *G02B 7/10* (2013.01); *G02B 7/102* (2013.01); *G03B 17/02* (2013.01); *G05G 5/03* (2013.01);
(Continued)

(58) Field of Classification Search
None
See application file for complete search history.

(56) References Cited

U.S. PATENT DOCUMENTS 6,067,424 A * 5/2000 Shono ................... G03B 17/00
200/336
6,788,890 B2 * 9/2004 Suzuki ..................... G02B 7/04
359/825
(Continued)

FOREIGN PATENT DOCUMENTS

JP 05-011163 A 1/1993
JP 2006-286349 A 10/2006
(Continued)

OTHER PUBLICATIONS

Oct. 8, 2019 Japanese Office Action, which is enclosed with an English Translation, that issued in Japanese Patent Application No. 2015246534.

*Primary Examiner* — William B Perkey
(74) *Attorney, Agent, or Firm* — Cowan, Liebowitz & Latman, P.C.

(57) ABSTRACT

The electronic apparatus includes a base member, a rotatable operation member, a clicking member rotatable together with the rotatable operation member, an exterior member disposed between the base and rotatable operation members, a switching operation member provided with an operation knob and movable between first and second positions, a pressing member and a contact, member both held by the base member, the pressing member being biased toward the clicking member, the contact member being biased toward the switching operation member to contact the switching operation member, and a stopper member movable together with the switching operation member. When the switching operation member is located at the first position, the pressing member contacts the concave and convex portions. When the switching operation member is located at the second position, the pressing member contacts the stopper member and held away from the concave and convex portions.

14 Claims, 12 Drawing Sheets

(51) Int. Cl.
   *G05G 5/03*     (2008.04)
   *H04N 5/225*    (2006.01)
(52) U.S. Cl.
   CPC ......... *H04N 5/2254* (2013.01); *H04N 5/2257* (2013.01); *G03B 2205/0046* (2013.01); *Y10T 74/20474* (2015.01)

(56) References Cited

U.S. PATENT DOCUMENTS

| | | | | |
|---|---|---|---|---|
| 8,757,903 | B2* | 6/2014 | Kuroiwa | G02B 5/005 |
| | | | | 396/505 |
| 9,606,569 | B2* | 3/2017 | Ueda | G05G 5/03 |
| 9,641,747 | B2* | 5/2017 | Yuge | H04N 5/225 |
| 9,958,636 | B2* | 5/2018 | Masuki | G02B 7/10 |
| 2008/0197004 | A1* | 8/2008 | Ishigaki | B60K 37/06 |
| | | | | 200/336 |
| 2012/0327274 | A1* | 12/2012 | Taguchi | H04N 5/232 |
| | | | | 348/240.2 |
| 2013/0335589 | A1* | 12/2013 | Yuge | H04N 5/225 |
| | | | | 348/222.1 |
| 2015/0098004 | A1* | 4/2015 | Ueda | G05G 5/03 |
| | | | | 348/335 |
| 2016/0065800 | A1* | 3/2016 | Doshin | H04N 5/2251 |
| | | | | 348/376 |
| 2017/0176713 | A1* | 6/2017 | Masuki | G02B 7/10 |

FOREIGN PATENT DOCUMENTS

| | | | |
|---|---|---|---|
| JP | 2011-008970 | A | 1/2011 |
| JP | 2011-39385 | A | 2/2011 |
| JP | 2014-48350 | A | 3/2014 |
| JP | 2015-75912 | A | 4/2015 |
| JP | 2015-169786 | A | 9/2015 |

* cited by examiner

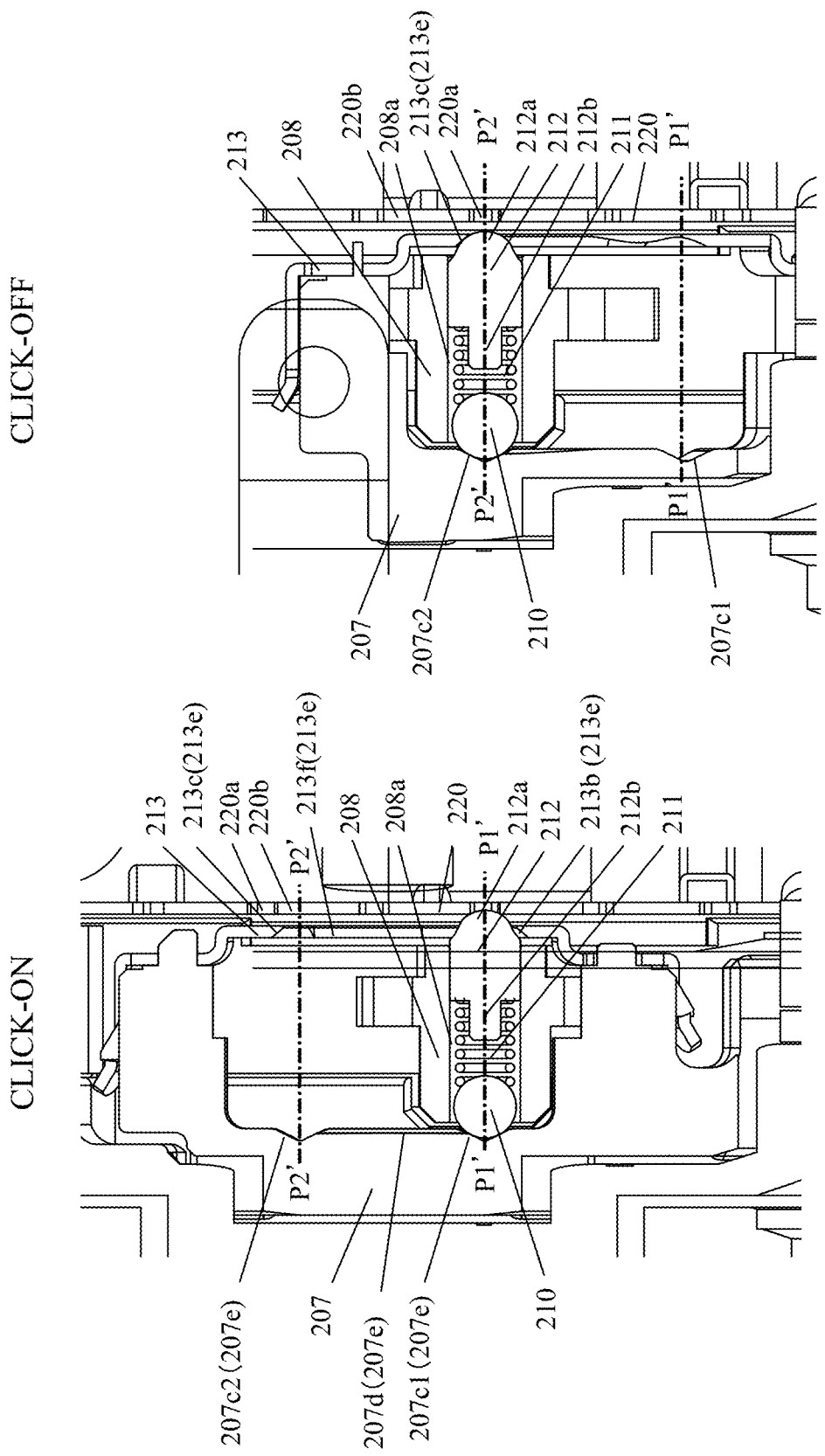

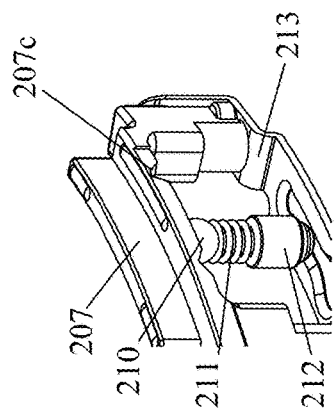
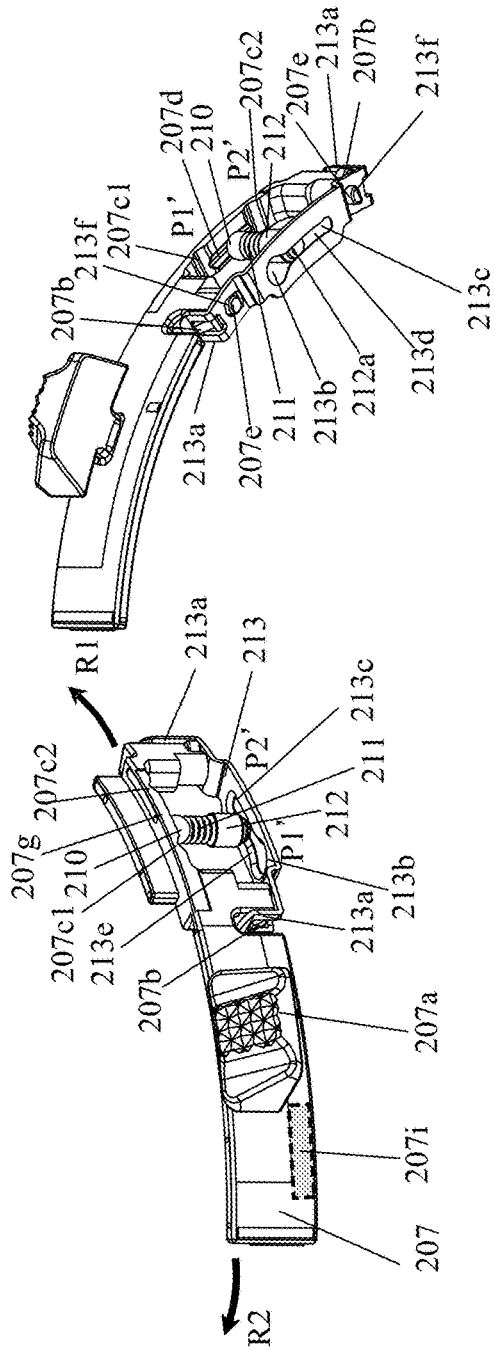
FIG. 9A
FIG. 9B
FIG. 9C

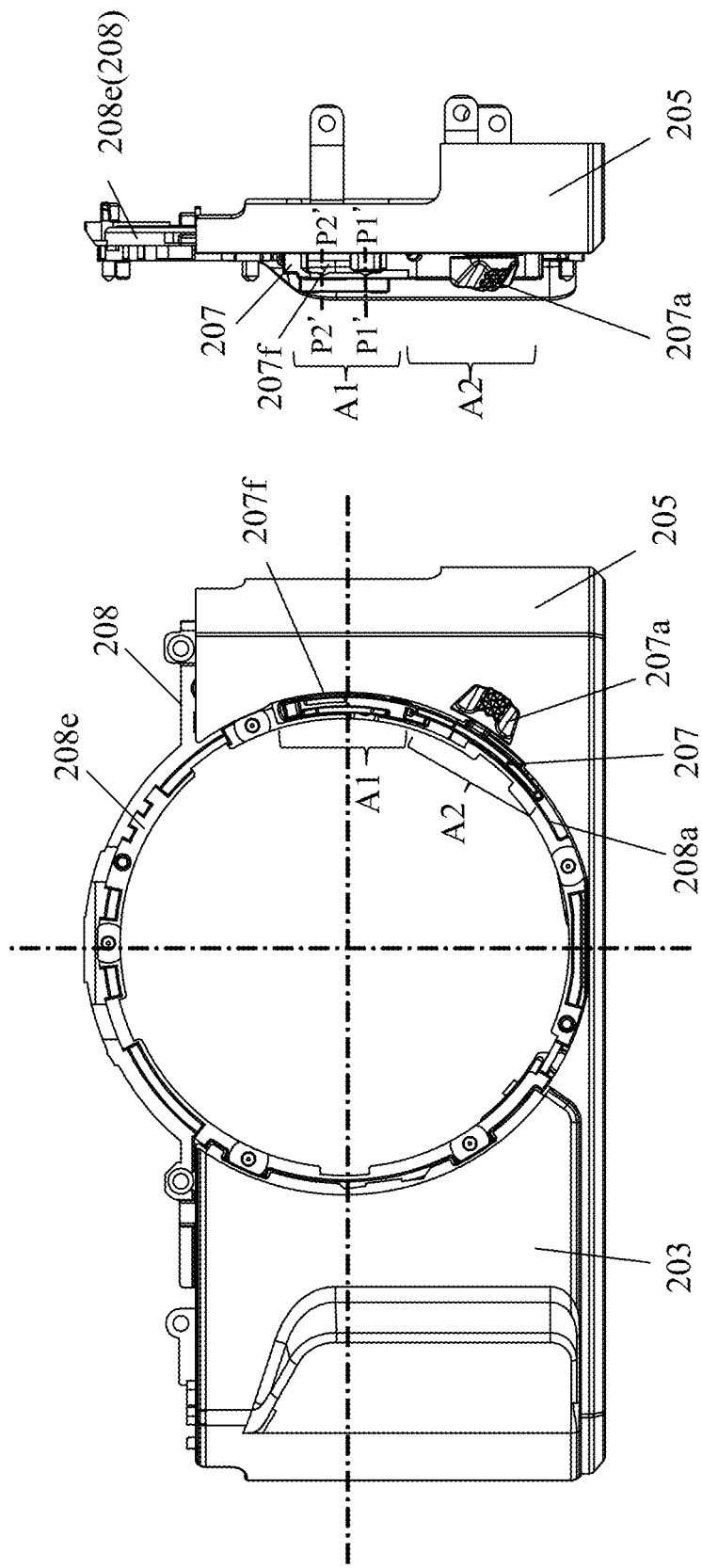

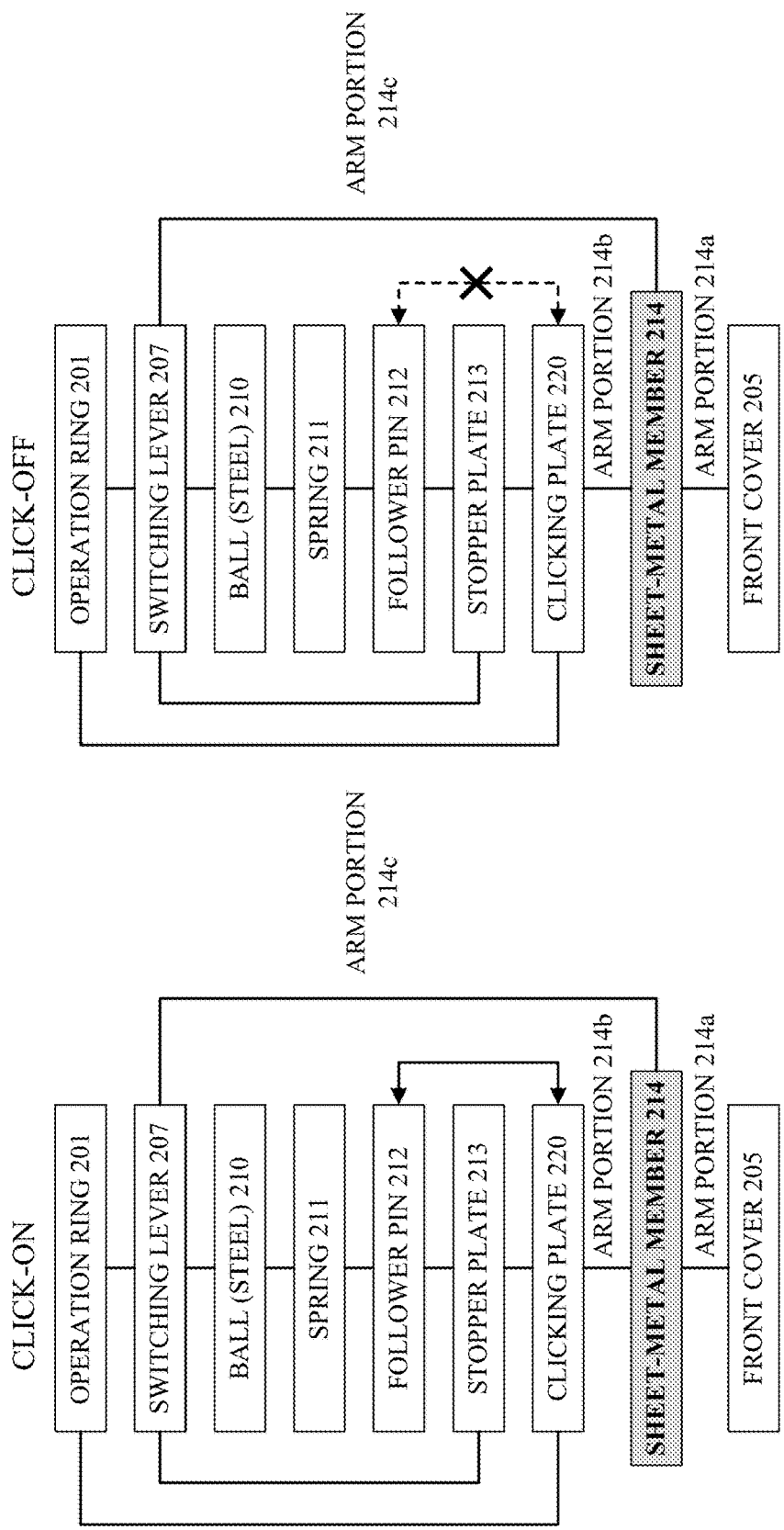

ELECTRONIC APPARATUS

CROSS-REFERENCE TO RELATED APPLICATION

This application is a divisional of application Ser. No. 15/381,758, filed Dec. 16, 2016, the entire disclosure of which is hereby incorporated by reference.

BACKGROUND OF THE INVENTION

Field of the Invention

The present invention relates to electronic apparatuses such as digital still cameras and digital video cameras, and particularly to an electronic apparatus including a rotatable operation member that is rotatably operable.

Description of the Related Art

Some electronic apparatuses are known, such as one disclosed in Japanese Patent Laid-Open No. 05-011163, each including a rotatable operation member such as an operation ring that is rotatably operable about a lens barrel provided on a front (object side) face of its apparatus body. A user's manual operation of that rotatable operation member enables zooming and focusing.

Furthermore, Japanese Patent Laid-Open No. 2011-008970 discloses a camera in which image capturing parameters such as a shutter speed, an F-number and an image capturing sensitivity are selectable by rotation operations of such a rotatable operation member. This camera provides a mechanism that generates click feeling for the rotation operation of the rotatable operation member so as to make it easy to set the image capturing parameters. However, the generation of the click feeling for each rotational operation of the rotatable operation member may cause click sounds to be recorded in motion image capturing.

On the other hand, Japanese Patent Laid-Open No. 2015-169786 discloses a camera switchable between a clicking state of generating click feeling for an operation of a rotatable operation member provided in an interchangeable lens and a non-clicking state of generating no click feeling. In this camera, the clicking state and the non-clicking state can be switched by a user's rotation of a switching operation portion exposed in the interchangeable lens detached from a camera body by using a tool such as a screw driver.

However, the camera disclosed in Japanese Patent Laid-Open No. 2015-169786 requires a detachment of the interchangeable lens from the camera body for rotating the switching operation portion to switch between the clicking state and the non-clicking state. In addition, this camera requires the tool for rotating the switching operation portion. Accordingly, the user cannot easily switch between the clicking state and the non-clicking state.

SUMMARY OF THE INVENTION

The present invention provides an electronic apparatus in which a user can more easily switch between generation and non-generation of click feeling for rotation operations of a rotatable operation member.

The present invention provides as an aspect thereof an electronic apparatus including a base member, a rotatable operation member disposed outside the base member and rotatable with respect to the base member, a clicking member disposed inside the base member, rotatable together with the rotatable operation member and having concave and convex portions arranged in a circumferential direction, an exterior member disposed between the base member and the rotatable operation member and having a shape extending in the circumferential direction, a switching operation member provided with an operation knob located at an outer circumference of the exterior member and movable with respect to the base member between a first position and a second position in the circumferential direction, a pressing member and a contact member both held by the base member, the pressing member being biased toward the clicking member, the contact member being biased toward the switching operation member to contact the switching operation member, and a stopper member movable together with the switching operation member with respect to the base member. When the switching operation member is located at the first position, the pressing member contacts the concave and convex portions, and when the switching operation member is located at the second position, the pressing member contacts the stopper member and held at a position away from the concave and convex portions.

Further features and aspects of the present invention will become apparent from the following description of exemplary embodiments with reference to the attached drawings.

BRIEF DESCRIPTION OF THE DRAWINGS

FIGS. 8A and 8B are sectional views respectively illustrating the click switching mechanism and therearound in the click-ON state and the click-OFF state in Embodiment.

FIGS. 9A to 9C are front side and rear side perspective views of the click switching mechanism and therearound in Embodiment.

FIG. 10A and 10B are front view and a side view of the front cover unit in Embodiment.

FIGS. 14A and 14B illustrate electric conductive paths in the front cover unit in Embodiment.

DESCRIPTION OF THE EMBODIMENTS

Exemplary embodiments of the present invention will hereinafter be described with reference to the accompanying drawings.

Figure 1:
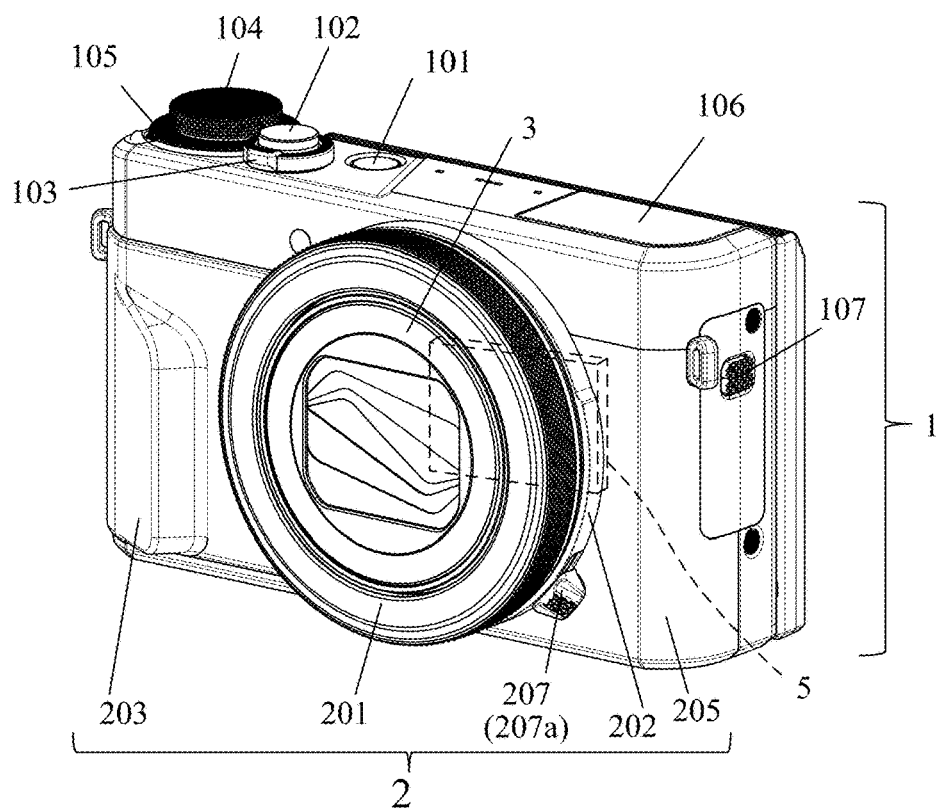
FIG. 1 is a front side perspective view of a digital camera that is Embodiment 1 of the present invention.
Figure 2:
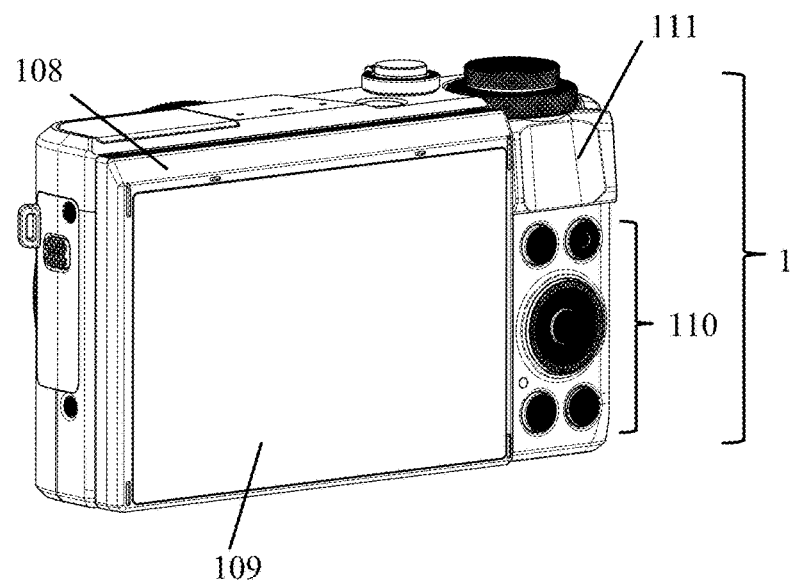
FIG. 2 is a rear side perspective view of a digital camera of Embodiment.

FIG. 1 illustrates a digital camera (hereinafter simply referred to as "a camera") as an electronic apparatus that is an embodiment of the present invention; the camera is obliquely viewed from an object side (hereinafter referred to as "a front side"). FIG. 2 illustrates the camera obliquely viewed from an imaging surface side (hereinafter referred to as "a rear side").

The camera 1 is provided, in its front part, with a zoom lens barrel unit 3 and an operation ring 201 that is a rotatable operation member. The lens barrel unit 3 houses thereinside an image capturing optical system. The operation ring 201 is rotatable around an outer circumference of the lens barrel unit 3. A user's rotation operation of the operation ring 201 changes image capturing functions or image capturing parameters. In the following description, a circumferential direction of the lens barrel unit 3 and a rotation direction of the operation ring 201 are referred to as "a circumferential direction" in the camera 1. The camera 1 further provided thereinside with an image sensor 5 that photoelectrically converts an object image (optical image) formed by the image capturing optical system to produce an image signal.

A front face of the camera 1 is covered by a front cover (exterior cover member) 207.

Near the operation ring 201, specifically at an outer circumference of a barrel cover (exterior member) 202 provided between the operation ring 201 and the front cover 205, an operation knob 207a of a switching lever (switching operation member) 207 later described is provided. A user's operation of the operation knob 207a to move it in the circumferential direction along an outer circumferential face of the barrel cover 202 enables switching between a click-ON state of generating click feeling with the rotation operation of the operation ring 201 and a click-OFF state of generating no click feeling.

On a top face of the camera 1, various operation members are provided. Specifically, a power button 101, a release button 102, a zoom lever 103, a mode dial 104 for switching image capturing modes and an exposure correction dial 105 for setting an exposure correction value. Furthermore, on a top of the camera 1, a flash unit 106 whose light emitting portion can pop up from the top face of the camera is provided. A user's operation of a flash lever 107 provided on a side face of the camera 1 causes the light emitting portion of the flash unit 106 to pop up. A front cover unit 2 illustrated in FIG. 1 includes the operation ring 201, the barrel cover 202, a front grip (grip member) 203, the front cover 205 and a click switching mechanism including the switching lever 207.

On the other hand, as illustrated in FIG. 2, on a rear face of the camera 1, a display 109, a display support 108 that supports the display 109 so as to allow its tilt, various operation members 110 and a rear grip 111 are provided. On the side face of the camera 1, a communication button (not illustrated) and electric terminals (covered by a terminal cover 107) for connecting the camera 1 to external devices are provided.

Figure 3:
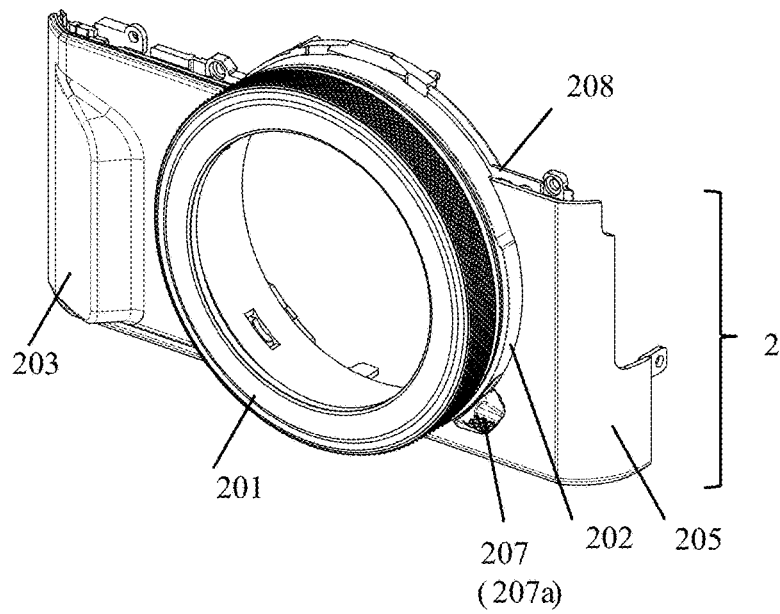
FIG. 3 is a front side perspective view of a front cover unit of the digital camera of Embodiment.
Figure 4:
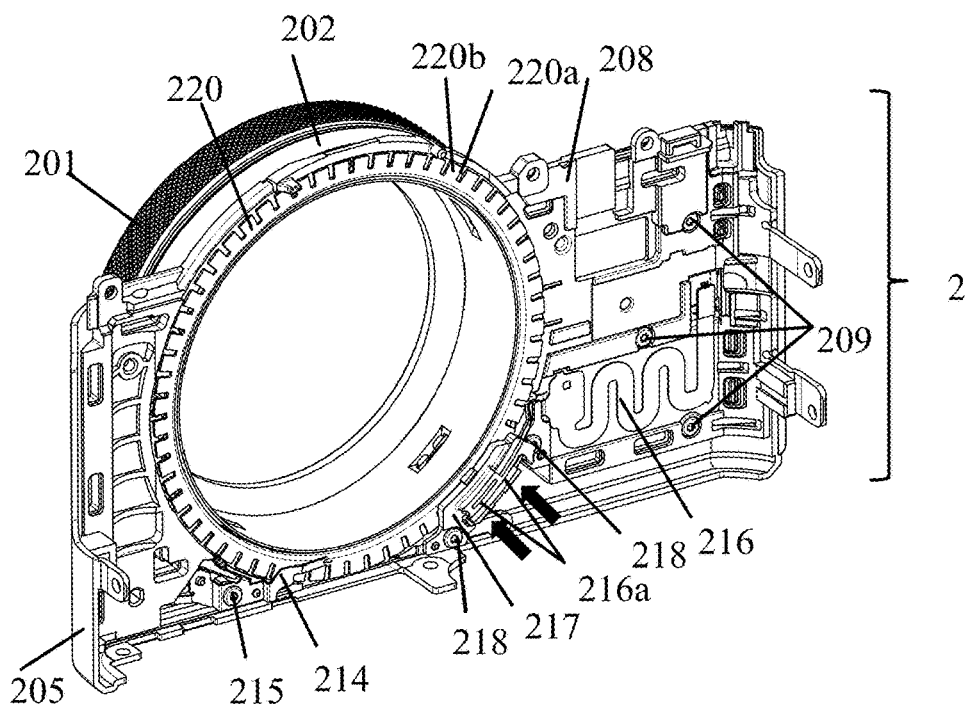
FIG. 4 is a rear side perspective view of the front cover unit.
Figure 5:
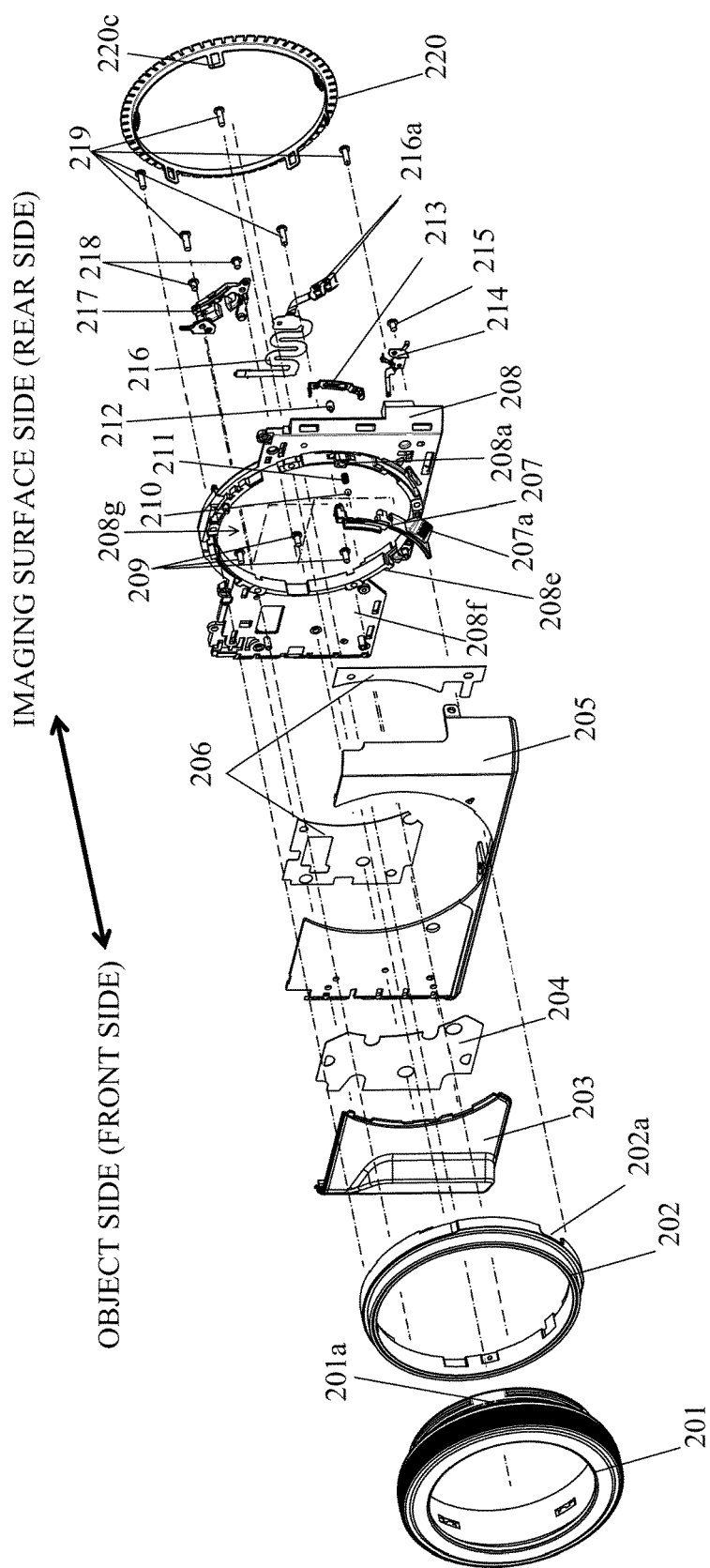
FIG. 5 is an exploded perspective view of the front cover unit.

Next, description will be made of a configuration of the front cover unit 2 to which the switching lever 207 is assembled, with referring to FIGS. 3 to 5. FIG. 3 illustrates the front cover unit 2 obliquely viewed from the front side (outer face side), and FIG. 4 illustrates the front cover unit 2 obliquely viewed from the rear side (inner face side). FIG. 5 is an exploded view of the front cover unit 2.

The front cover unit 2 includes a base member 208, the operation ring 201, a clicking plate (clicking member) 220, the barrel cover 202, the front grip 203 and the front cover 205. Furthermore, the front cover unit 2 includes the click switching mechanism including the switching lever 207 and includes two rotation detectors 216a.

The rotation detectors 216a are each constituted by, as illustrated in FIG. 4, a photo interrupter that detects boundaries in the clicking plate 220 between cutout portions (concave portions) 220a formed in the circumferential direction at equal intervals and convex portions 220b formed between cutout portions. The two rotation detectors 216a are mounted on a flexible wiring board 216 and each output bright and dark signals in response to the detection of the boundaries. Using the bright and dark signals enables calculating a rotation direction and a speed of the clicking plate 220 (that is, of the operation ring 201 integrally rotatable with the clicking plate 220 as described later). The click switching mechanism is constituted by, as illustrated in FIG. 5, the switching lever 207, a ball (contact member) 210, a spring (biasing member) 211, a follower pin (pressing member) 212 and a stopper plate (stopper member) 213.

Description will be made of a configuration and an assembling procedure of the front cover unit 2 with referring to FIG. 5. The base member 208 as a backbone of the front cover unit 2 includes thereinside a barrel holding portion 208e and a front face 208f. The barrel holding portion 208e has a ring-like shape in which a barrel opening 208g for expose the lens barrel unit 3 is formed. The front face 208f is formed on right and left sides of the barrel holding portion 208e. The front cover 205 is fixed to the front face 208f with a double-stick tape 206. Furthermore, the front grip 203 temporarily fixed to a front face of the front cover 205 with a double-stick tape 204 is fixed to the base member 208 together with the front cover 205 with three screws 209 inserted from its rear side. The front grip 203 is formed of elastomer or the like having a cushioning characteristic for increasing a gripping force when a user's right hand grips it and covers, of the front cover 205, from a right end to a vicinity of the operation ring 201.

The switching lever 207 is assembled to the barrel holding portion 208e of the base member 208 from the front side. The barrel cover 202 is further assembled to the barrel holding portion 208e so as to sandwich the switching lever 207 with the barrel holding portion 208e. The switching lever 207 is sandwiched between the barrel holding portion 208e and the barrel cover 202 to be positioned with respect to the base member 208 in a front-and-rear direction (that is, in an optical axis direction of the lens barrel unit 3). The barrel cover 202 is fixed to the base member 208 with five screws 219 inserted from its rear side. The operation knob 207a of the switching lever 207 passes through a knob cutout portion (concave opening) 202a formed at a circumferential part of the barrel cover 202 to be disposed at the outer circumference of the barrel cover 202. The circumferential operation of this operation knob 207a along the outer circumferential face of the barrel cover 202 as described above causes the switching lever 207 sandwiched between the base member 208 and the barrel cover 202 to move (slide) in the circumferential direction.

On the other hand, at a part of the barrel holding portion 208e of the base member 208, a through-hole portion 208a penetrating therethrough in the front-and rear direction is formed. The ball 210, the spring 211 and the follower pin 212 are inserted into this through-hole portion 208a in this order. Furthermore, the stopper plate 213 is disposed so as to face a rear end opening of the through-hole portion 208a. This configuration connects (fixes) the stopper plate 213 to the switching plate 207 so as to be movable together therewith. As illustrated in FIG. 9C, positioning convex portions 207e provided at two longitudinal direction (circumferential direction) positions in the switching lever 207 engage with positioning hole portions 213f provided at longitudinal ends of the stopper plate 213. Moreover, hook portions 213a provided at the longitudinal ends of the stopper plate 213 are hooked to protruding portions 207*b* provided at two longitudinal direction positions in the switching lever 207.

Although this embodiment described the case where the identical spring 211 biases the ball 210 and the follower pin 212 in mutually opposite directions, a configuration may be employed such that separate springs bias them in the mutually different direction.

On the rear side further than the barrel holding portion 208*e* of the base member 208 to which the click switching mechanism is thus assembled (that is, on an opposite side to the operation ring 201 across the base member 208), the clicking plate 220 is disposed. As illustrated in FIG. 4, the clicking plate 220 is connected (fixed) to the operation ring 201 so as to be movable together therewith through hook portions 220*c* provided at five circumferential positions of the clicking plate 220 and engaging with protruding portions 201*a* provided at five circumferential positions of the operation ring 201.

To the base member 208 to which the operation ring 201 and the clicking plate 220 are thus assembled, the rotation detectors 216*a* are assembled from an outer circumferential side (allow direction in FIG. 4). In addition, a holding member 217 for preventing movements of the rotation detectors 216*a* away from the base member 208 is fixed to the base member 208 with two screws 218.

Finally, a sheet-metal member 214 is fixed to the base member 208 with a screw 215 such that the sheet-metal member 214 contacts the front cover 205, the switching lever 207 and the clicking plate 220. This completes the assembly of the front cover unit 2. In this embodiment, the front cover 205 and the switching lever 207 are formed of metal.

Figure 6:
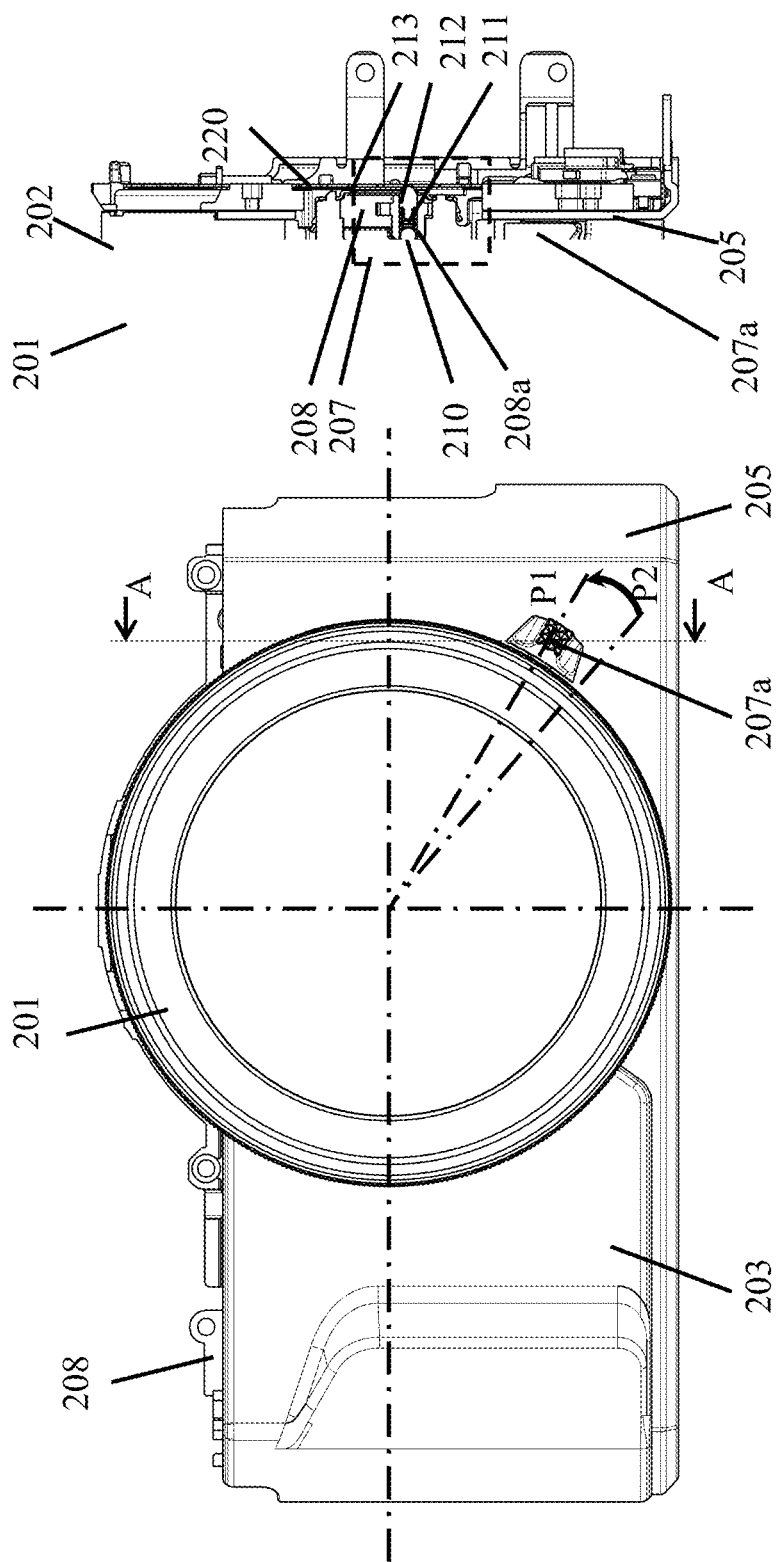
FIG. 6 is a front view of the front cover unit and a sectional view illustrating a click switching mechanism and therearound in a click-ON state in Embodiment.
Figure 7:
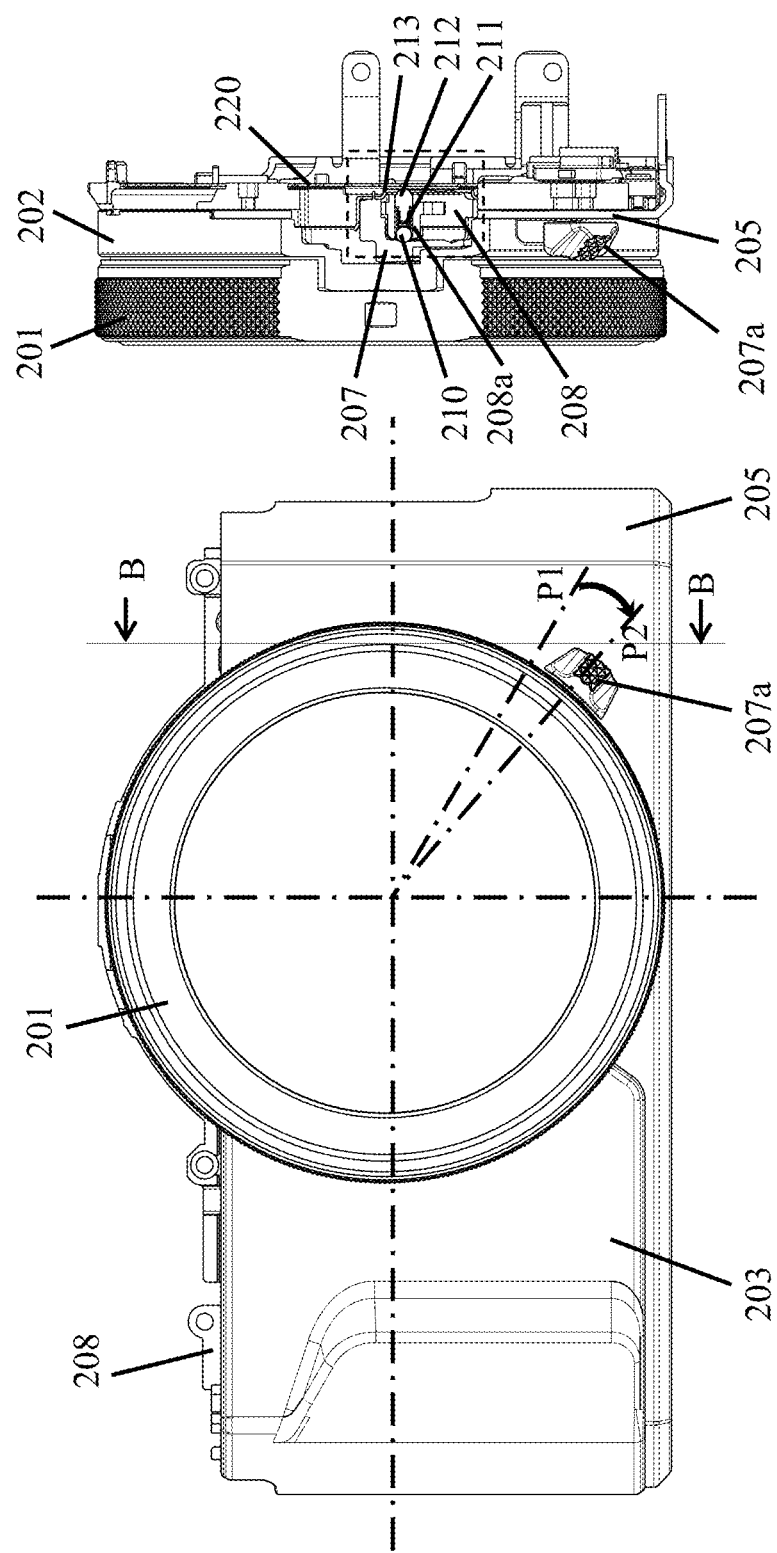
FIG. 7 is a front view of the front cover unit and a sectional view illustrating the click switching mechanism and therearound in a click-OFF state in Embodiment.

Next, detailed description will be made of the click switching mechanism with referring to FIGS. 6 to 9C. FIG. 6 illustrates the front cover unit 2 and the click switching mechanism when the switching lever 207 is located at an operation position P1 (first position; hereinafter referred to as "a click-ON position") corresponding to the click-ON state. A right drawing of FIG. 6 illustrates a section at an A-A line in a left drawing thereof. FIG. 7 illustrates the front cover unit 2 and the click switching mechanism when the switching lever 207 is located at an operation position P2 (second position; hereinafter referred to as "a click-OFF position") corresponding to the click-OFF state. A right drawing of FIG. 7 illustrates a section at a B-B line in a left drawing thereof.

FIG. 8A is an enlarged view of part (surrounded by a broken line in the A-A section illustrated in FIG. 6) of the click switching mechanism in the click-ON state. FIG. 8B is an enlarged view of part (surrounded by a broken line in the B-B section illustrated in FIG. 7 ) of the click switching mechanism in the click-OFF state. FIGS. 9A to 9C illustrate the switching lever 207, the ball 210, the spring 211, the follower pin 212 and the stopper plate 213 in an intermediate state (hereinafter referred to as "an ON/OFF intermediate state") between the click-ON state and the click-OFF state. In FIGS. 9A to 9C, the base member 208 is omitted.

As described above, the ball 210, the spring 211 and the follower pin 212 are disposed inside the through-hole portion 208*a* formed in the barrel holding portion 208*e* of the base member 208. These ball 210, spring 211 and follower pin 212 are sandwiched between the switching lever 207 located on the front side of the barrel holding portion 208*e* and the stopper plate 213 located on the rear side thereof. In such a configuration, a biasing force generated by the compressed spring 211 biases the ball 210 toward the switching lever 207 and biases the follower pin 212 toward the stopper plate 213 (clicking plate 220). A stopper plate (213) side end portion 212*a* of the follower pin 212 is formed in a semispherical shape.

At one of two longitudinal direction positions in the switching lever 207, a first concave portion 201*c*1 is formed. At another of the two longitudinal direction positions therein, a second concave portion 207*c*2 is formed. Furthermore, the switching lever 207 is provided with a guide groove portion 207*d* formed so as to connect the first concave portion 207*c*1 to the second concave portion 207*c*2. These first concave portion 207*c*1, second concave portion 207*c*2 and guide groove portion 207*d* are each provided with tapered faces 207*e* formed so as to open toward the ball 210.

At one of two slide direction positions (circumferential direction positions) in the stopper plate 213 that slides together with the switching lever 207, a large diameter hole portion (first opening portion) 213*b* is formed. At another of the two slide direction positions therein, a small diameter hole portion (second opening portion) 213*c* is formed. The large diameter hole portion 213*b* has an inner diameter larger than an outer diameter of the end portion 212*a* of the follower pin 212. That is, the large diameter hole portion 213*b* has such an inner diameter that allows the end portion 212*a* to penetrate therethrough as described later.

On the other hand, the small diameter hole portion 213*c* has an inner diameter smaller than the outer diameter of the end portion 212*a* of the follower pin 212. That is, the small diameter hole portion 213*c* has a diameter that prevents the end portion 212*a* from penetrating therethrough.

Moreover, the stopper plate 213 is provided with a guide groove portion 213*f* formed so as to connect the large diameter hole portion 213*b* to the small diameter hole portion 213*c*. The guide groove portion 213*f* has a width smaller than the inner diameter of the small diameter hole portion 213*c*. The large diameter hole portion 213*b*, the small diameter hole portion 213*c* and the guide groove portion 213*f* are each provided with tapered faces 213*e* formed so as to open toward the follower pin 212.

In the click-ON state illustrated in FIGS. 6 and 8A, the ball 210 biased by the biasing force generated by the spring 211 engages with the first concave portion 207*c*1 of the switching lever 207 and contacts the tapered faces 207*e* of the first concave portion 207*c*1 in a pressed state. Thus, the switching lever 207 and the stopper plate 213 that are slidable are stably located at the click-ON position P1. At the click-ON position P1, the end portion 212*a* of the follower pin 212 is moved at a position (protruded position) where the end portion 212*a* penetrates through the large diameter hole portion 213*b* formed at a circumferential positon P1' equal to that of the first concave portion 207*c*1 of the stopper plate 213 and protrudes from the large diameter hole portion 213*b*. Then, the end portion 212*a* of the follower pin 212 contacts the concave portion 220*a* and convex portion 220*b* (hereinafter collectively referred to as "concave and convex portions 220*a/b*") of the clicking plate 220 in a pressed state. Therefore, the rotation of the clicking plate 220 with the operation ring 201 causes the follower pin 212 biased by the spring 211 to fall in and climb on the concave and convex portions 220*a/b* of the clicking plate 220, which generates click feeling.

In the click-OFF state illustrated in FIGS. 7 and 8B, the ball 210 engages with the second concave portion 207*c*2 of the switching lever 207 and contacts the tapered faces 207*e* of the second concave portion 207*c*2 in a pressed state. Thus, the switching lever 207 and the stopper plate 213 that are slidable are stably located at the click-OFF position P2. At the click-OFF position P2, the end portion 212a of the follower pin 212 contacts the tapered faces 213e in the small diameter hole portion 213c formed at a circumferential positon P2' equal to that of the second concave portion 207c2 of the stopper plate 213, which prevents the end portion 212a from moving to the above-mentioned protruded position. That is, the end portion 212a of the follower pin 212 is held at a position away from the concave and convex portions 220a/b of the clicking plate 220. Therefore, the rotation of the clicking plate 220 with the operation ring 201 generates no click feeling. A spring (211) side part (base end side part) of the follower pin 212 nearer than the end portion 212a has a diameter larger than the inner diameter of the large diameter hole portion 213b of the stopper plate 213. Therefore, the entire follower pin 212 does not penetrate through the large diameter hole portion 213b. This configuration enables checking the motion of the switching lever 207 even before the assembly of the clicking plate 220 to the rear of the stopper plate 213, which makes it possible to improve ease of assembly of the front cover unit 2.

While the switching lever 207 is slid from the click-OFF position P2 to an R1 direction illustrated in FIG. 9B and from the click-ON position P1 to an R2 direction illustrated in the same drawing, the state of the click switching mechanism becomes the ON/OFF intermediate state illustrated in FIGS. 9A to 9C. In this ON/OFF intermediate state, the ball 210 contacts the tapered faces 207e of the guide groove portion 207d in the switching lever 207. Furthermore, in the end portion 212a of the follower pin 212 a part other than an endmost face (hereinafter referred to as "a clicking contact face") that contacts the concave and convex portions 220a/b of the clicking plate 220 contacts the tapered faces 213e of the guide groove portion 213f of the stopper plate 213. With this configuration, as well as in the click-OFF state, the end portion 212a of the follower pin 212 is held at the position away from the concave and convex portions 220a/b of the clicking plate 220. The clicking contact face of the follower pin 212 is an important portion that contacts the concave and convex portions 220a/b of the clicking plate 220 to set the click feeling. Therefore, this embodiment provides the guide groove portion 213f to the stopper plate 213 to prevent the clicking contact face from abrading away by its slide with respect to the stopper plate 213. That is, this embodiment prevents the clicking contact face from contacting the stopper plate 213. In addition, providing the guide groove portion 213f decreases the biasing force of the spring 211, which enables lightening operation feeling during the switching.

When the switching lever 207 is operated from the click-ON position P1 to the click-OFF position P2 (this operation is hereinafter referred to as "a click-OFF operation"), it is necessary to move the ball 210 away from the first concave portion 207c1. Furthermore, it is necessary to largely compress the spring 211 such that the end portion 212a of the follower pin 212 climbs on the guide groove portion 213d from the state of penetrating through the large diameter hole portion 213b of the stopper plate 213. Accordingly, a large operating force may be required.

On the other hand, when the switching lever 207 is operated from the click-OFF position P2 to the click-ON position P1 (this operation is hereinafter referred to as "a click-ON operation"), it is also necessary to move the ball 210 away from the second concave portion 207c2. Furthermore, it is necessary to largely compress the spring 211 such that the end portion 212a of the follower pin climbs on the guide groove portion 213d from the small diameter hole portion 213c of the stopper plate 213. However, in order to cause the end portion 212a of the follower pin 212 falling in the small diameter hole portion 213c to climb on the guide groove portion 213d, it is enough to compress the spring 211 by a small amount. Therefore, only a smaller operating force than for the click-OFF operation is necessary. That is, the click-OFF operation may generate an operation load larger than that in the click-ON operation.

However, it is desirable that a difference in operation loads between the click-ON operation and the click-OFF operation be small, and it is more desirable that the operation loads therebetween be equivalent to each other. Thus, in this embodiment, a depth of the first concave portion 207c1 of the switching lever 207 is larger than that of the second concave portion 207c2.

The depth of the first concave portion 207c1 larger than that of the second concave portion 207c2 increases a length of the spring 211 in the click-ON state. Accordingly, it is possible to reduce a force necessary to compress the spring 211 when the end portion 212a of the follower pin 212 climbs on the guide groove portion 213d from the large diameter hole portion 213b of the stopper plate 213. As a result, it is possible to make the operation load (that is, the operating force) for the OFF operation close to or equivalent to that for the click-ON operation. However, it is necessary that the length of the spring 211 in the click-ON state generate an appropriate click feeling (click load) for the rotation operation of the operation ring 201.

In order to decrease the difference in the operation loads between the click-OFF operation and the click-ON operation or make the operation loads therebetween equivalent to each other, other methods may be used instead of the method of making the depth of the first concave portion 207c1 larger than that of the second concave portion 207c2 or with that method. For example, a method may be used that makes a taper angle (that is, a tilt angle with respect to the slide direction) of each tapered face 207e of the second concave portion 207c2 of the switching lever 207 larger than that of the first concave portion 207c1 so as to increase a load for the ball 210 escaping from the second concave portion 207c2.

Furthermore, this embodiment provides to the switching lever 207 the guide groove portion 207d formed so as to connect the first and second concave portions 207c1 and 207c2, which enables making behaviors of the ball 210 in the click-OFF and click-ON operations. Especially, as described above, when setting the depth of the first concave portion 207c1 to be larger than that of the second concave portion 207c2, changing (decreasing) the depth of the guide groove portion 207d gradually from the first concave portion 207c1 enables providing a smooth operation feeling.

Although this embodiment described the case of disposing the ball 210 on the switching lever (207) side and disposing the follower pin 212 on the stopper plate (213) side. However, a ball may be used instead of the follower pin 212, and a follower pin may be used instead of the ball 210. Moreover, a configuration may be employed in which a follower pin is disposed on the switching lever side and a ball is disposed on the stopper plate side. In the case of using the ball 210, since when the switching lever 207 is slid, the ball 210 not only is moved along the guide groove portion 207d but also rolls itself, which provides a smoother operation feeling.

In the case of using the follower pin 212, whereas its end portion 212a has a semispherical shape, the other portion than the end portion 212a has a cylindrical shape, so that the follower pin 212 can have an arbitrary set length. Thus, it is possible to acquire a sufficient engagement length of the follower pin 212 with respect to the through-hole portion 208a of the base member 208. In addition, as illustrated in FIGS. 8A and 8B, the follower pin 212 has a shaft portion 212b inserted inside the spring 211.

Furthermore, in this embodiment, after the switching lever 207 is assembled to the base member 208 and the barrel cover 202 is fixed to the base member 208 with the screws 219, the ball 210, the spring 211 and the follower pin 212 are inserted in this order from the rear side into the through-hole portion 208a of the base member 208. If the follower pin 212 finally inserted is replaced by the ball 210, the stopper plate 213 is assembled in a state where the ball 210 is disposed on a rear end of the spring 211 inserted inside the through-hole portion 208a of the base member 208. However, this configuration biases the ball 210 toward the stopper plate 213, so that the ball 210 inevitably protrudes from the rear end opening of the through-hole portion 208a of the base member 208.

Thus, depending on a natural length the spring 211, the ball 210 may be inserted only by a small amount into the through-hole portion 208a of the base member 208. In this case, at the assembly of the stopper plate 213, the ball 210 is likely to drop off from the base member 208. Therefore, this embodiment uses not the ball but the follower pin 212 to acquire the sufficient engagement length of the follower pin 212 with respect to the through-hole portion 208a of the base member 208 and further inserts the shaft portion 212b into the spring 211. This configuration makes it possible to improve ease of assembly and stability of the click switching mechanism.

FIG. 10 illustrates the switching lever 207 assembled to the barrel holding portion 208e of the base member 208 in the front cover unit 2. The switching lever 207 has a circular-arc shape extending along the barrel cover 202 and slides in the circumferential direction with being guided by the guide groove portion 208a formed in a circular-arc shape in the barrel holding portion 208e.

In an area A1 illustrated in FIG. 10, when the switching lever 207 is moved between the click-ON position and the click-OFF position, the click switching mechanism (the ball 210, the spring 211, the follower pin 212 and the stopper plate 213) is located (moved). In an area A2, when the switching lever 207 is moved between the click-ON position and the click-OFF position, a portion of the switching lever mechanism at which the operation knob 207a is provided, that is, a main body portion of the switching lever 207 is located (moved). This embodiment, arranges the areas A1 and A2 in the circumferential direction to dispose these areas A1 and A2 within a radial thickness of the barrel cover 202, that is, within a radial thickness of the operation ring 201.

In terms of force transmission, providing the operation knob 207a of the switching lever 207 at a center of the area A1 where the click switching mechanism is disposed enables transmitting an operating force to the switching lever 207 with no loss of the force. However, employing such a configuration requires providing a wall for connecting the operation knob 207a on outside of a side face portion 207f of the switching lever 207, which increases in radial size by a thickness of the wall and thereby the switching lever 207 cannot be disposed within the radial thickness of the operation ring 201.

Furthermore, if the operation knob 207a is connected to the side face portion 207f of the barrel cover 202 illustrated in FIG. 9B, it is necessary to form, at a part of the barrel cover 202 along the side face portion 207f, a cutout portion corresponding to the nob cutout portion 202a illustrated in FIG. 5. Such a cutout portion makes an inside of the switching lever 207 visible from outside. Accordingly, it is necessary to provide, around the side face portion 207f, a wall for making the inside invisible from the outside, which increases in radical size by a thickness of the wall. For these reasons, the area A1 where the click switching mechanism is disposed and the area A2 where the operation knob 207a is disposed are desirable to be arranged in the circumferential direction.

Figure 11B:
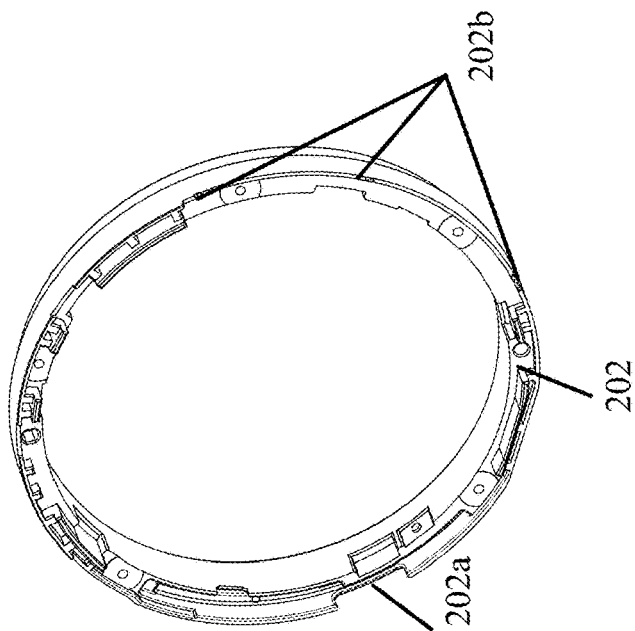
FIGS. 11A and 11B are exploded perspective views of the front cover unit and a barrel cover in Embodiment.
Figure 11A:
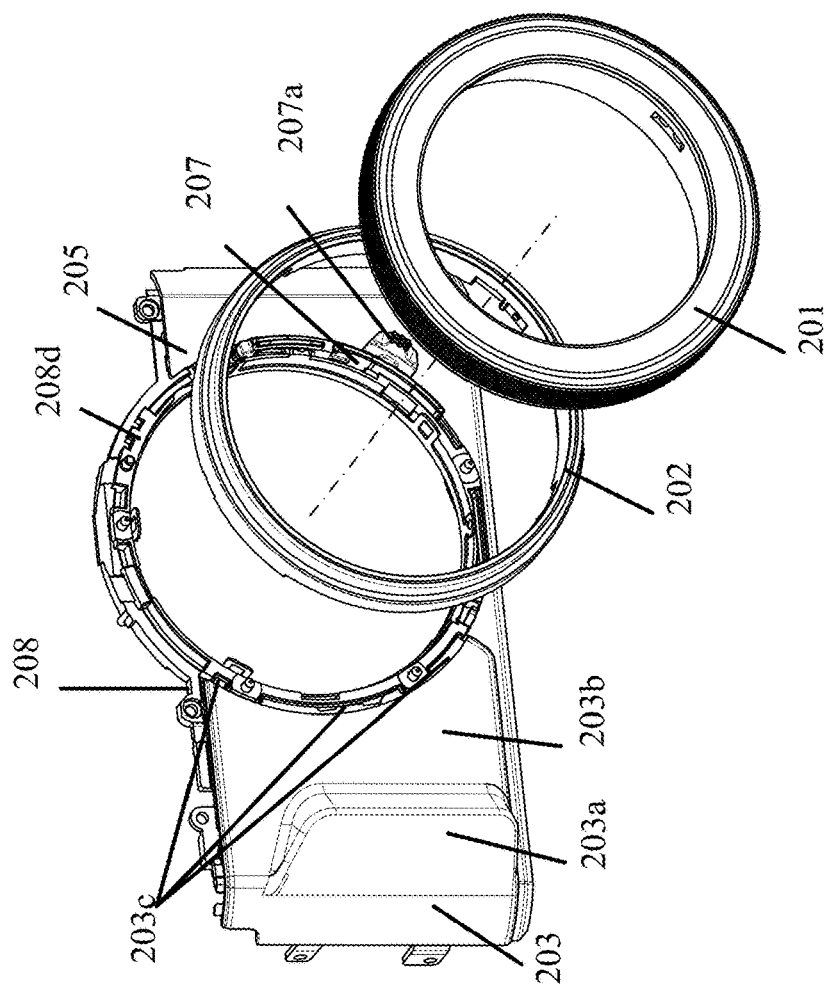

FIG. 11A illustrates, of the front cover unit 2, the base member 208, the barrel cover 202 and the operation ring 201, which are separate from each other. The click switching mechanism (switching lever 207 and others) is assembled to the barrel holding portion 208d of the base member 208.

In the front cover unit 2, a user's right hand that grips the camera 1 contacts a grip portion 203a and an extended grip portion 203b of the front grip 203; the extended grip portion 203b is extended to a vicinity of the operation ring 201. The grip portion 203a and the extended grip portion 203b each have a cushioning characteristic. Gripping the camera 1 so as to wrap the grip portion 203a by a right-hand palm and so as to support the extended grip portion 203b by right-hand fingers enables providing an improved camera holding feeling As described above, the front grip 203 is fixed to the base member 208 with the screws 209 after being temporarily fixed to the front cover 205 with the double-stick tape 204. However, of the front grip 203, only a part around the grip portion 203a where sufficient depths of holes before threading for the screws 209 can be acquired is solidly fixed to the base member 208. Especially, of the extended grip portion 203b, a part near the operation ring 201 is fixed only by the double-stick tape 204, which may provide an insufficient fixing strength. Therefore, this embodiment uses, of the barrel holding portion 208d of the base member 208 and the barrel cover 202, other areas than the areas sandwiching the switching lever 207 to fix the extended grip portion 203b to the base member 208. That is, of the front grip 203, a circular-arc edge portion (exterior member side end portion) 203c extending along the barrel cover 202 (and the operation ring 201) is sandwiched by the barrel holding portion 208d and the barrel cover 202.

FIG. 11B illustrates the barrel cover 202 from the rear side. At three circumferential positions of the barrel cover 202, protruding portions 202b are provided that overlap the edge portion 203c of the front grip 203. With this configuration, fixing the front grip 203 to the base member 208 with the above-described screws 219 enables solidly fixing the grip portion 203a and the extended grip portion 203b of the front grip 203 to the base member 208.

Figure 12B:
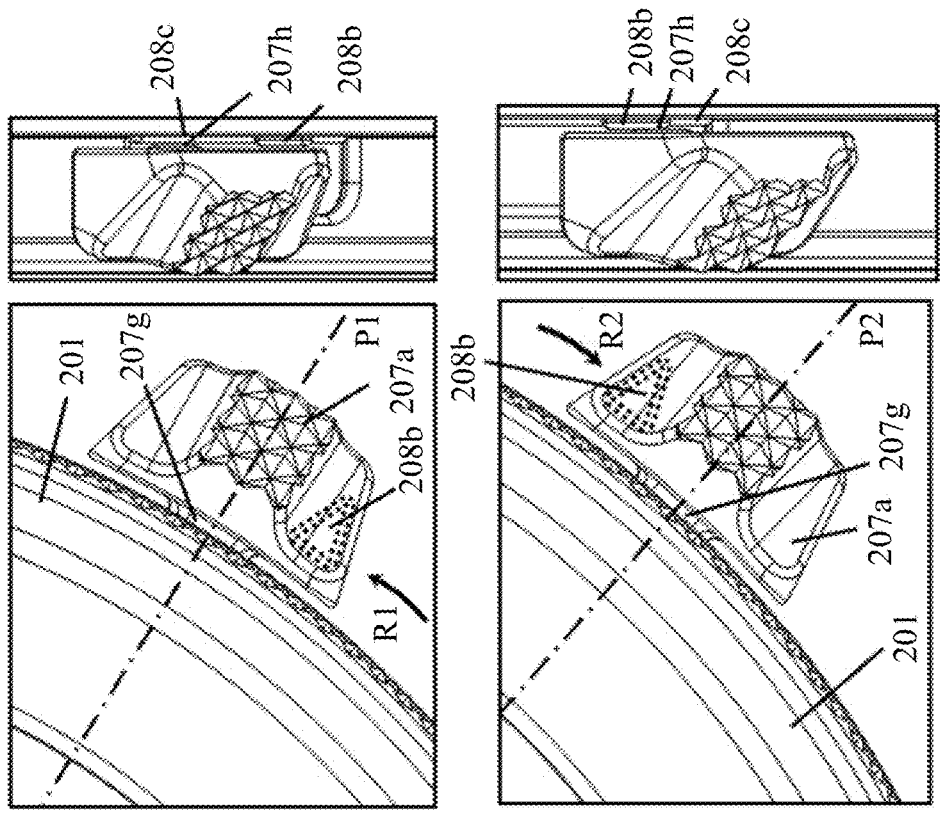
FIG. 12A and 12B are front, enlarged front and side views of the front cover unit in Embodiment.
Figure 12A:
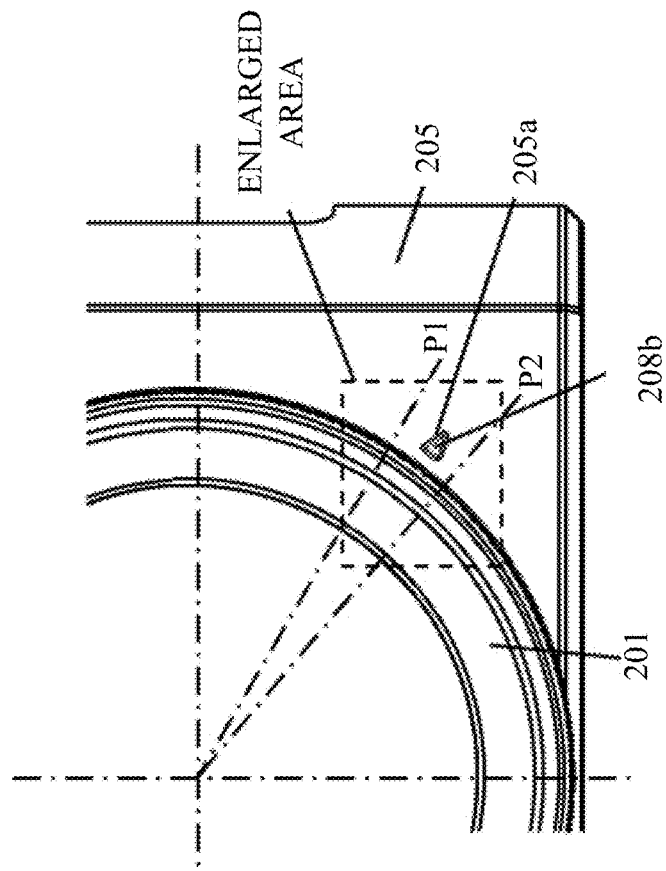

FIG. 12A illustrates the front cover 205 viewed from the front side when the switching lever 207 is removed from the front cover unit 2. In a front face of the base member 208, a triangle-like shaped protruding portion 208b is formed so as to protrude toward the front side. The front cover 205 includes a through-hole portion (protrusion opening portion) 205a through which the protruding portion 208b penetrates.

Upper and lower parts of FIG. 12B respectively illustrate a relation between the protruding portion 208b and the operation knob 207a of the switching lever 207 located at the click-ON position P1 and a relation therebetween in which the switching lever 207 located at the click-OFF position P2. The protruding portion 208b is located behind the operation knob 207a in both a state where the operation knob 207a is operated in the R1 direction to reach the click-ON position P1 and a state where the operation knob 207a is operated in the R2 direction to reach the click-OFF position P2.

Thus, the protruding portion 208b is not visible from the front side. This protruding portion 208b is provided in order to receive, by the base member 208, the operation knob 207a deformed by a user's pressing force from the front side toward the rear side so as to prevent the operation knob 207a from contacting the front cover 205.

Although not illustrated in FIG. 12A, the switching lever 207 includes a protruding portion 207h formed on a rear face of a connecting portion 207g that extends from inside the barrel cover 202 to the operation knob 207a. Furthermore, the base member 208 also includes a protruding portion 208c formed so as to receive the protruding portion 207h. Thus, when the operation knob 207a is deformed by being pressed from the front side toward the rear side, the operation knob 207a and the connecting portion 207g are respectively received by the protruding portion 208b and the protruding portion 208c.

Figure 13:
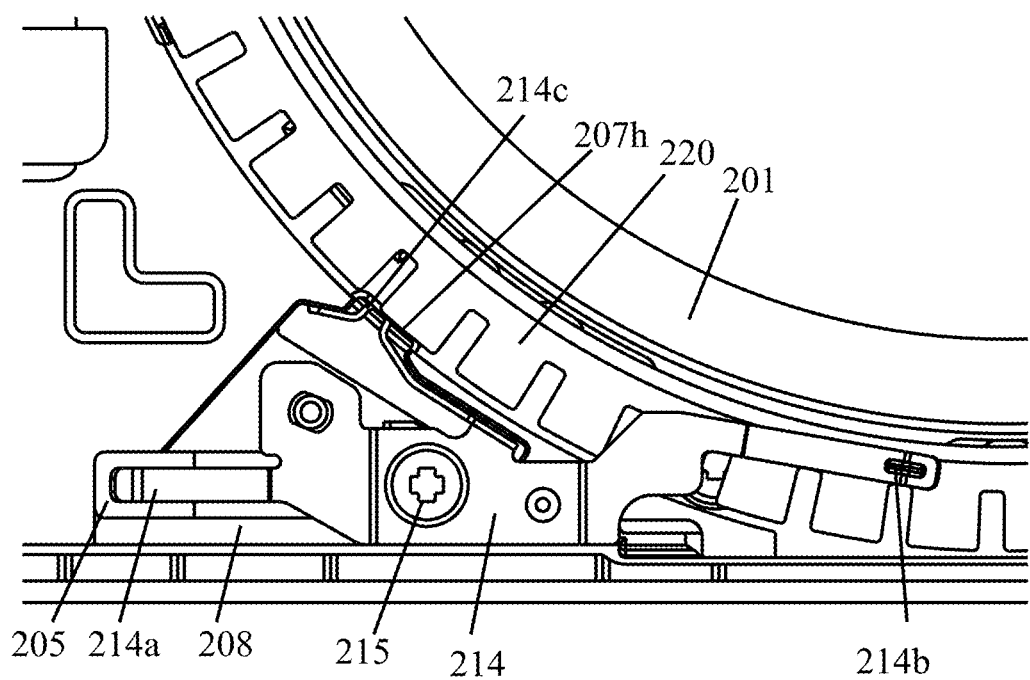
FIG. 13 is an enlarged view illustrating a sheet-metal member and therearound of the front cover unit in Embodiment.

Next, description will be made of electrical conductivity of the front cover unit 2 with referring to FIGS. 13, 14A and 14B. FIG. 13 illustrates, of the front cover unit 2, a part around the above-described sheet-metal member 214 viewed from the rear side. FIGS. 14A and 14B illustrate electrical conductive paths in the front cover unit 2.

As illustrated in FIG. 13, the sheet-metal member 214 as an electric conductive member is positioned and mounted (fixed) to the front face (outer face) of the base member 208 with a screw 215 and thereby is electrically conductive to the base member 208. Arm portions (contact portions) 214a, 214b and 214c of the sheet-metal member 214 respectively contact the front cover 205, the clicking plate 220 and a side face portion 207i (illustrated in FIG. 9B) of the switching lever 207 in a pressed state by biasing forces generated by their elastic deformation. With this configuration, the sheet-metal member 214 electrically conductively contacts the front cover 205, electrically conductively contacts the clicking plate 220 in its entire rotatable range and electrically conductively contacts the switching lever 207 in its entire movable range.

As respectively illustrated in FIGS. 14A and 14B, the electrical conductive paths in the camera 1 are changed between in the click-ON state and the click-OFF state. In the click-ON state illustrated in FIG. 14A, the switching lever 207, the ball 210, the spring 211, the follower pin 212 and the stopper plate 213, which are metal components constituting the click switching mechanism, contact one another to be electrically conductive to one another. Furthermore, the operation ring 201 and the clicking plate 220 sandwiching this click switching mechanism therebetween are integrally connected with each other, and the follower pin 212 contacts the clicking plate 220. With this configuration, the click switching mechanism, the operation ring 201 and the clicking plate 220 are all electrically conductive to one another. In addition, the arm portion 214a of the sheet-metal member 214 contacts the front cover 205, and the arm portion 214b contacts the clicking plate 220, so that all the metal components in the front cover unit 2 are electrically conductive to the front cover 205. Moreover, the front cover unit 2 is electrically connected to all other metal components in the camera 1 through the front cover 205.

On the other hand, also in the click-OFF state illustrated in FIG. 14B, the switching lever 207, the ball 210, the spring 211 and the stopper plate 213, which constitute the click switching mechanism, are electrically conductive to one another. However, since the follower pin 212 does not contact the clicking plate 220 integrally connected with the operation ring 201, the click switching mechanism may be electrically isolated. Against this problem, since in this embodiment the arm portion 214c of the sheet-metal member 214 contacts the side face portion 207i of the switching lever 207, all the metal components of the front cover unit 2 are electrically conductive to the front cover 205. The front cover unit 2 is electrically connected to all other metal components in the camera 1 through the front cover 205.

As just described, this embodiment avoids the click switching mechanism being electrically isolated in both the click-ON and click-OFF states, by only using one sheet-metal member 214, which enables keeping the front cover unit 2 in an electrically stable state.

As described above, this embodiment achieves a compact camera allowing easily switching between the click-ON state and the click-OFF state by a user's operation of the operation knob 207a from outside the camera. In other words, it is possible to switch between generation and non-generation of the click feeling for a user's rotation operation of the rotatable operation member in response to a user's simple hand (finger) operation of the operation knob disposed at the outer circumference of the exterior member.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-246534, filed on Dec. 17, 2015, which is hereby incorporated by reference herein in its entirety.

What is claimed is:

1. An image capturing apparatus comprising:
a lens barrel member housing an image capturing optical system;
a base member;
a rotatable operation member disposed outside the base member and rotatable with respect to the base member;
a clicking member disposed inside the base member, rotatable together with the rotatable operation member and having concave and convex portions arranged in a circumferential direction;
a switching operation member provided with an operation knob located at an outer circumference of the lens barrel member and movable with respect to the base member between a first position and a second position in the circumferential direction;
a pressing member held by the base member; and
a stopper member movable together with the switching operation member with respect to the base member,
wherein, when the switching operation member is located at the first position, the pressing member is in a click-ON state of contacting the concave and convex portions, and
when the switching operation member is located at the second position, the pressing member is in a click-OFF state of contacting the stopper member and being held at a position away from the concave and convex portions,
wherein the rotatable operation member is rotatable in a circumferential direction of the lens barrel member and a rotation operation of the rotatable operation member changes image capturing parameters, and
wherein the stopper member includes (a) a first opening portion allowing the pressing member to pass therethrough to a protrusion position at which the pressing member contacts the concave and convex portions when the switching operation member is located at the first position and (b) a second opening portion preventing the pressing member from passing therethrough to the protrusion position when the switching operation member is located at the second position.

2. An image capturing apparatus according to claim 1, wherein the stopper member includes, between the first opening portion and the second opening portion, a groove portion for preventing an endmost face of the pressing member from sliding with respect to the stopper member while preventing the pressing member from passing through the stopper member to the protrusion position.

3. An electronic apparatus comprising:
a base member;
a rotatable operation member disposed outside the base member and rotatable with respect to the base member;
a biasing member;
a clicking member disposed inside the base member rotatable together with the rotatable operation member and having concave and convex portions arranged in a circumferential direction;
a switching operation member provided with an operation knob and movable with respect to the base member between a first position and a second position in the circumferential direction;
a pressing member held by the base member,, the pressing member being biased toward the clicking member by the biasing member in a rotation axis direction of the rotatable operation member; and
a stopper member movable together with the s witching operation member with respect to the base member in the circumferential direction,
wherein, when the switching operation member is located at the first position, the pressing member contacts the concave and convex portions, and
when the switching operation member is located at the second position, the pressing member contacts the stopper member and held at a position away from the concave and convex portions, and
wherein the stopper member includes (a) a first opening portion allowing the pressing member to pass therethrough to a protrusion position at which the pressing member contacts the concave and convex portions when the switching operation member is located at the first position and (b) a second opening portion preventing the pressing member from passing therethrough to the protrusion position when the switching operation member is located at the second position.

4. An electronic apparatus according to claim 3 further comprising:
a contact member held by the base member, the contact member being biased toward the switching operation member to contact the switching operation member,
wherein the pressing member and the contact member are biased by the biasing member.

5. An electronic apparatus according to claim 3, wherein the stopper member includes (a) a first opening portion allowing the pressing member to pass therethrough to a protrusion position at which the pressing member contacts the concave and convex portions when the switching operation member is located at the first position and (b) a second opening portion preventing the pressing member from passing therethrough to the protrusion position when the switching operation member is located at the second position.

6. An electronic apparatus according to claim 5, wherein the stopper member includes, between the first opening portion and the second opening portion, a groove portion for preventing an endmost face of the pressing member from sliding with respect to the stopper member while preventing the pressing member from passing through the stopper member to the protrusion position.

7. An electronic apparatus according to claim 3 further comprising:
a contact member held by the base member, the contact member being biased toward the switching operation member to contact the switching operation member,
wherein the switching operation member includes (a) a first concave portion with which the contact member engages when the switching operation member is located at the first position and (b) a second concave portion with which the contact member engages when the switching operation member is located at the second position, and
the first concave portion has a depth larger than that of the second concave portion.

8. An electronic apparatus according to claim 7, wherein:
the first and second concave portions each have a tapered face, and
the tapered face of the second concave portion has a tilt angle larger than that of the first concave portion.

9. An electronic apparatus comprising:
a base member;
a rotatable operation member disposed outside the base member and rotatable with respect to the base member;
a biasing member;
a clicking member disposed inside the base member, rotatable together with the rotatable operation member and having concave and convex portions arranged in a circumferential direction;
a switching operation member provided with an operation knob and movable with respect to the base member between a first position and a second position in the circumferential direction;
a pressing member held by the base member, the pressing member being biased toward the clicking member by the biasing member in a rotation axis direction of the rotatable operation member;
a stopper member movable together with the switching operation member with respect to the base member in the circumferential direction; and
a contact member held by the base member, the contact member being biased toward the switching operation member to contact the switching operation member,
wherein, when the switching operation member is located at the first position, the pressing member contacts the concave and convex portions, and
when the switching operation member is located at the second position, the pressing member contacts the stopper member and held at a position away from the concave and convex portions, and
wherein:
the switching operation member has a shape extending in the circumferential direction,
of the switching operation member, a portion where the contact member, the pressing member and the stopper member are disposed and a portion where the operation knob is provided are arranged in the circumferential direction.

10. An electronic. apparatus according to claim 3 further comprising:
an exterior member disposed between the base member and the rotatable operation member and having a shape extending in the circumferential direction,
wherein the switching operation member is held by being disposed between base member and the exterior member.

11. An electronic apparatus according to claim 3, wherein:
an outer cover member covering an outer face of the base member is provided between the base member and the operation knob; and
the base member has a protruding portion that penetrates a protrusion opening portion formed in the outer cover member and faces the operation knob.

12. An electronic apparatus comprising:
a base member;
a rotatable operation member disposed outside the base member and rotatable with respect to the base member;
a biasing member;
a clicking member disposed inside the base member, rotatable together with the rotatable operation member and having concave and convex portions arranged in a circumferential direction;
a switching operation member provided with an operation knob and movable with respect to the base member between a first position and a second position in the circumferential direction;
a pressing member held by the base member, the pressing member being biased toward the clicking member by the biasing member in a rotation axis direction of the rotatable operation member;
a stopper member movable together with the switching operation member with respect to the base member in the circumferential direction;
an exterior member disposed between the base member and the rotatable operation member and having a shape extending in the circumferential direction;
an outer cover member covering an outer face of the base member; and
a grip member fixed at outside of the outer over member,
wherein, when the switching operation member is located at the first position, the pressing member contacts the concave and convex portions, and
when the switching operation member is located at the second position, the pressing member contacts the stopper member and held at a position away from the concave and convex portions, and
wherein an exterior member side end portion of the grip member is sandwiched between the base member and the exterior member.

13. An electronic apparatus comprising:
a base member;
a rotatable operation member disposed outside the base member and rotatable with respect to the base member;
a biasing member;
a clicking member disposed inside the base member, rotatable together with the rotatable operation member and having concave and convex portions arranged in a circumferential direction;
a switching operation member provided with an operation knob and movable with respect to the base member between a first position and a second position in the circumferential direction;
a pressing member held by the base member, the pressing member being biased toward the clicking member by the biasing member in a rotation axis direction of the rotatable operation member;
a stopper member movable together with the switching operation member with respect to the base member in the circumferential direction; and
an electric conductive member fixed to an outer face of the base member and being electrically conductive to the base member,
wherein, when the switching operation member is located at the first position, the pressing member contacts the concave and convex portions, and
when the switching operation member is located at the second position, the pressing member contacts the stopper member and held at a position away from the concave and convex portions, and
wherein the electric conductive member contacts an outer cover member covering the outer face of the base member so as to be electrically conductive thereto, contacts the clicking member so as to be electrically conductive thereto in its entire rotatable range and contacts the switching operation member so as to be electrically conductive thereto in its entire movable range.

14. An electronic apparatus according to claim 3, further comprising:
a lens barrel housing an optical system; and
an image sensor configured to photoelectrically convert object image formed by the optical system,
wherein the base member has a shape surrounding outside the lens barrel.

* * * * *